United States Patent [19]

Hochreuter

[11] 4,389,202
[45] Jun. 21, 1983

[54] SHEARING PIN MOMENT OF ROTATION LIMITING ARRANGEMENT FOR TWO CONSTRUCTIONAL UNITS THAT ARE ROTATABLE RELATIVE TO ONE ANOTHER

[76] Inventor: Johann Hochreuter, Brauhausstrasse 6, 8800 Ansbach, Fed. Rep. of Germany

[21] Appl. No.: 261,747

[22] Filed: May 8, 1981

[30] Foreign Application Priority Data

May 9, 1980 [DE] Fed. Rep. of Germany ....... 3017722

[51] Int. Cl.³ ........................... F16D 3/56; F16D 9/00
[52] U.S. Cl. .......................................... 464/33; 403/2
[58] Field of Search .......... 464/33, 32; 403/2, DIG. 3

[56] References Cited

U.S. PATENT DOCUMENTS

| | | | |
|---|---|---|---|
| 1,978,209 | 10/1934 | Kuhns | 464/33 X |
| 2,969,661 | 1/1961 | Swanson | 464/33 |
| 2,976,704 | 3/1961 | Kleinschmidt | 464/33 |
| 3,855,818 | 12/1974 | Hochreuter | 464/33 |
| 4,186,570 | 2/1980 | Pokrandt | 464/33 |

FOREIGN PATENT DOCUMENTS

| | | |
|---|---|---|
| 1030631 | 5/1958 | Fed. Rep. of Germany . |
| 1329624 | 5/1963 | France . |
| 381403 | 10/1932 | United Kingdom ..................... 403/2 |

Primary Examiner—Stuart S. Levy
Assistant Examiner—Daniel P. Stodola
Attorney, Agent, or Firm—Orrin M. Haugen; Thomas J. Nikolai

[57] ABSTRACT

A torsionally elastic shaft coupling arrangement with shear pins, and with a common cone bearing surface being utilized to drive the units. The coupling arrangement includes first and second constructional units which are rotatable relative to each other, and wherein the cone bearing surface extends taperingly intermediate the two coupling halves. Each constructional unit has an annular frontal surface and the frontal surfaces are disposed generally in axial alignment, and a locking ring having flanged portions extending therefrom encloses the annular frontal surfaces. A plurality of resilient attachment elements are distributed about the circumference of one of the constructional units to apply a biasing force to the locking ring so as to cause the surface of the locking ring to be maintained in running engagement with the frontal surface of the other constructional unit. An axial clearance is provided along a portion of the running surface of the locking ring to compensate for wear along the cone bearing surfaces, and thereby avoid introduction of oscillatory motion in the system which has been found to generate radial shearing forces on the shear pins.

2 Claims, 1 Drawing Figure

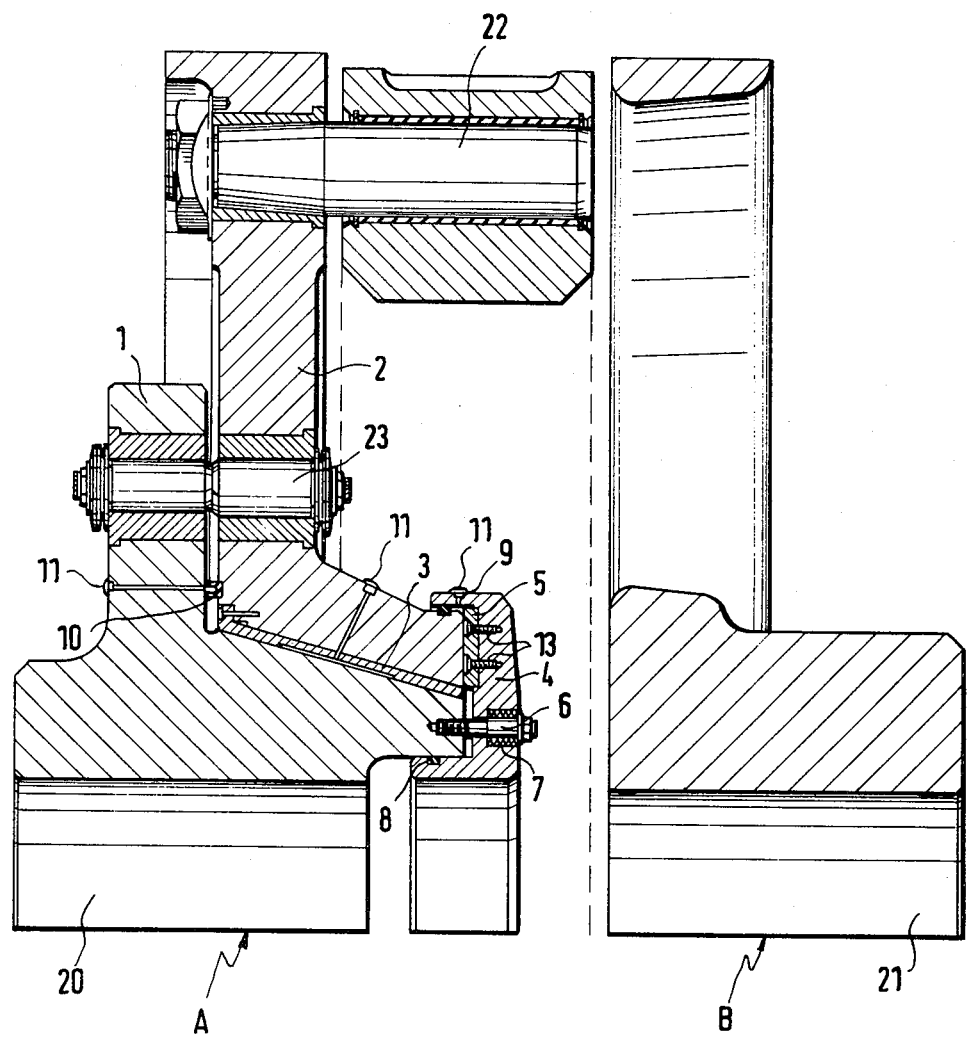

SHEARING PIN MOMENT OF ROTATION LIMITING ARRANGEMENT FOR TWO CONSTRUCTIONAL UNITS THAT ARE ROTATABLE RELATIVE TO ONE ANOTHER

BACKGROUND OF THE INVENTION

Already known in accordance with French Patent 1,329,624 is an arrangement where the one of the two constructional units is arranged in stationary fashion and forming, for example, the stator of an electric generator, while the other constructional unit is arranged on the bearing of a traversing shaft, for example the generator shaft. The constructional unit arranged on the generator shaft is prestressed axially, in fashion of a full surface contact of the common cone bearing surface against the stator, by a group of locking pawls distributed over the circumference of the stator and prestressed radially, inwardly. Achieved by this means is that the shearing pins arranged between the two constructional units will not be loaded by radial oscillations between the two constructional units and break, in undesired fashion, before reaching a preselected maximum moment of rotation. Rather, relative to the shearing pins, loading occurs exclusively by tangential shearing action. In the case of the known arrangement, exceeding the maximum moment of rotation can then occur when the shaft bearing, on which one of the two constructional units is supported, locks. If such a case of overloading does occur, then the constructional unit supported on the shaft is pushed away axially from the stator by several hydraulic positioning members in the stator, arranged in distributed fashion over its circumference, so that a radial play then arises at the common cone bearing surface, and the constructional unit that is supported on the shaft having a second cone surface is, at the same time, brought into engagement with a second cone surface of the stator, whereby, as a result instead of a blocked and/or destroyed bearing, a second redundancy bearing is set into operation. Transfer from the destroyed bearing to the redundant bearing is accomplished during a single revolution of the shaft by actuation of an electromagnetic switch. The overall arrangement requires, compared to the diameter, relatively great axial dimensions.

Known from U.S. Pat. No. 4,186,570 is a shearing pin moment of rotation limiting arrangement, in a rigid shaft coupling, that comprises two approximately coaxial coupling halves, in a stationary arrangement, each one on an associated shaft journal. Arranged in distributed fashion over the circumference of the two coupling halves are several shearing pins that are braced inside of each of the two coupling halves by means of slotted cone bushings. Oscillatory loadings of the shearing pins as a result of mutual vibrations of the two shaft journals are also avoided with this arrangement, so that the shearing pins are loaded exclusively by tangential shearing forces. In the event of a reaction of the shearing pins, which means a shearing off of all shearing pins, these latter are to be removed individually from the two coupling halves and a new set of shearing pins is to be installed and carefully fixed by means of the slotted cone bushings. This requires a considerable expenditure of time. Furthermore, there also exists the danger that the screws to used to fix the shearing pins will become loose in operation, whereby reliability of reaction at the preselected maximum moment of rotation would be reduced.

Also known are torsionally elastic shaft couplings that comprise two approximately coaxial coupling halves in a stationary arrangement, each one on an associated shaft journal. Each one of the coupling halves displays, distributed over its circumference, projections that extend over to the other coupling half. Arranged between the projections are tangential springs which, depending upon the applied moment of rotation, are more or less strongly compressed. In the case of torsionally elastic couplings, as are used for example between drive motors and the rollers of a steel rolling works, there is as yet no known auxiliary arrangement for protection against exceeding a predetermined maximum moment of rotation.

SUMMARY OF THE INVENTION

The task for the invention, starting out from a torsionally elastic shaft coupling as precedingly described in the foregoing paragraph, is to provide, additionally, an arrangement for limiting to a predetermined moment of rotation, with this arrangement increasing the structural dimensions as little as possible and that is, moreover, easily accessible for repair and maintenance purposes. This is achieved by the characterizing features of patent claim 1.

Since in the case of a torsionally elastic coupling, from which the present invention starts out, the two coupling halves necessarily display an axial interval from one another, in order to accept the spring elements arranged between the two coupling halves, and since, in accordance with the invention, the common cone bearing surface of the two constructional units, rotatable relative to one another, of the one coupling half extend into the intermediate space, resulting as a special advantage is that, in the case of the most usual type torsionally elastic shaft couplings of the type mentioned, an increase in the axial structural dimensions is not at all required. The locking ring required in accordance with the invention for mutual, axial prestressing of the two constructional elements can likewise be produced with a very small axial dimension so that an increase of the axial dimensions of the shaft coupling is likewise not required on account of the locking ring. Moreover, the locking ring is relatively easily accessible for repair and maintenance purposes. As compared to U.S. Pat. No. 4,186,570 that was discussed initially, there results the advantage that, in the case of a shaft coupling in accordance with the invention, the shearing pins, with the two constructional units, rotatable relative to one another, of the one coupling half does not have to be braced, rather, more to the point, the shearing pins should and must display a certain amount of axial play. In the same manner, any oscillatory loading of the shearing pins because of radial oscillations of the two constructional units, rotatable relative to one another, of the one coupling half is reliably prevented. In contrast to the shaft coupling in accordance with U.S. Pat. No. 4,186,570, this advantage also results when the two shaft journals go through certain oscillations opposing one another, since the constructional elements of the coupling shaft in accordance with the invention that are coupled together by shearing pins sit exclusively on the one shaft journal.

Resulting from further development in accordance with patent claim 2 is the advantage of an easier dismantling and, additionally, a check on the wear of the cone bearing surface of the two constructional units that are rotatable relative to one another. In contrast to the moment of rotation limiting arrangement of the precedingly discussed French Patent No. 1,329,624 where, in the case of a reaction, i.e. shearing off of the shearing pins, the common cone bearing surface of the two constructional units is separated immediately within one revolution, in the case of a shaft coupling in accordance with the invention we start out from the fact that the two constructional units that are rotatable relative to one another rotate for a certain amount of time, relative to one another, after shearing off of the shearing pins, which can lead to corresponding wear of the cone bearing surface. To the measure that the heads of the screw bolts project from the locking ring, a decision can be reached concerning the degree of wear of the common cone bearing surface so that, after a certain number of reaction processes and/or breakage of the shearing pins, the common cone bearing surface can be refinished.

IN THE DRAWING

The invention is explained in more detail in the following with the aid of the drawing, which illustrates one example of embodiment of a shearing pin moment of rotation limiting arrangement in accordance with the invention in conjunction with the torsionally elastic shaft coupling.

DESCRIPTION OF THE PREFERRED EMBODIMENT

The shaft coupling illustrated in the drawing comprises two coupling halves A and B, each of which includes a hub boring 20, 21 for stationary acceptance of one each associated (not illustrated) shaft journal. The two coupling halves are in torsionally elastic engagement with one another via several axis engagement elements 22, in turn distributed over the circumference, with, for the sake of better viewing, only a single one of this type of engagement element being illustrated in connection with coupling half A. Couplings with this type of engagement elements have been known for a long time and do not form a component of the present invention, so that a description of the method of functioning does not appear to be required.

The coupling half A is divided into two constructional units 1, 2 that are rotatable relative to one another on a common cone bearing surface, over the circumference of which are arranged, in distributed fasion, several mutually engaging shearing pins 23. In the case of the example of embodiment illustrated, the common cone bearing surface, formed by the inner surface of a conical bearing 3, screwed together with the constructional unit 2, lies against a conical outer surface of constructional unit 1. Therefore, in the case of coupling half A, the one constructional unit 1 sits stationary on the shaft journal (not illustrated) associated to the coupling half A, while the other constructional unit 2 finds itself in torsionally elastic engagement with the other coupling half B the common cone bearing surface and/or bushing 3 extends taperingly into the intermediate space between the two coupling halves A, B.

Formed at the tapered end of the cone bearing surface and/or bearing bushing 3, on both constructional units, 1, 2, are annular frontal surfaces having an approximately axial orientation. Attached to the annular frontal surface of constructional unit 1 is an axial locking ring 4, covering over both annular frontal surfaces, with several screw bolts 6 distributed over the circumference, between the heads of which and the locking ring 4 is arranged one packet of cup springs 7. The locking ring 4 is pressed axially against the annular frontal surface of constructional unit 2 by the cup springs 7 and, in this manner, occasions a full surface contact of the bearing bushing 3 against the corresponding cone surface of constructional unit 1, without regard to the state of wear on the associated bushing 3.

On one of the inner ring surfaces facing constructional unit 2, locking ring 4 is provided with running slide surface 5, attached by screws 13, so that, upon reaction of shearing pins 23, damage to the oppositely lyling annular frontal surfaces of the locking ring 4 and of constructional unit 2 is avoided. Furthermore, locking ring 4 is provided with a shell overlapping constructional units 1 and 2 in the region of their annular frontal surfaces, and sealed off from constructional units 1, 2 by means of circular joints 8, 9. On the side facing away from coupling half B, the common cone bearing surface of constructional units 1, 2 is sealed off by means of a circular joint 10, which is, to a certain measure, compressible so that eventual wearing of the bearing bushing 3 can be compensated for, in conjunction with a mutual rapprochement of constructional units 1, 2.

In the case of shearing off of shearing pin 23, in order to achieve a trouble-free lubrication and, consequently, less wear of the contacting sections of constructional units 1, 2, provided, distributed over the circumference of constructional units 1, 2 as well as over the circumference of locking ring 4, are several lubrication connections 11 through which a lubricant can be introduced, either occasionally or continuously.

In the event of shearing off of shearing pin 23, without regard as to whether the coupling half A is not located on a driven shaft journal and a coupling half B on a driving shaft journal, or vice versa, there occurs a relative rotation of constructional units 1 and 2 which, in spite of lubrication via the lubricant connections 11, can lead to a certain amount of wear of the bearing bushing 3. Accordingly, the shaft coupling can be set into operation again by installation of a group of new shearing pins 23 whereby, without regard to wear of the bearing bushing 3 possibly having occurred in the meantime, the common cone bearing surface of constructional units 1, 2 is continuously maintained in full-surface contact by the action of locking ring 4. Consequently, the shearing pins 23 are stressed exclusively by tangential shearing action, not however by oscillations. This latter also occurs particularly from the fact that both constructional units 1, 2 belong to one and the same coupling half A and, therewith, sit on a common shaft journal. The eventual wear of bearing bushing and/or of the running slide strip 5 can be checked, without trouble, by checking how much the heads of screw bolts 6 project as compared to the outer frontal surface of locking ring 4.

I claim:

1. In a torsionally elastic shaft coupling arrangement having a shearing pin moment of rotation limiting arrangement for two constructional units rotatable relative to one another on a common cone bearing surface, over the circumference of which are arranged in spaced apart relationship several mutually engaging shearing pins and which are movable in slight measure axially toward one another as well as being prestressed for a full-surface contacting of the common cone bearing surface and being characterized in that:

(a) said shaft coupling arrangement comprises first and second approximately coaxial coupling halves disposed in stationary arrangement with each being on an associated shaft journal;

(b) the first coupling half being divided into first and second constructional units that are rotatable relative to each other and wherein one is held stationary on the shaft journal associated to said first coupling half and with said second constructional unit being in torsionally elastic engagement with said second coupling half, the arrangement being such that the common cone bearing surface extends taperingly into the intermediate space between said two coupling halves;

(c) said constructional units each having a tapered end with an annular frontal surface being formed on each tapered end, and with said tapered ends being generally oriented along a common axial plane;

(d) an axial locking ring with flanged portions extending therefrom enclosing the annular frontal surfaces of said constructional units, said axial locking ring being secured to said first constructional unit and slightly spaced from both of said annular frontal surfaces to provide a clearance between said ring and said annular frontal surfaces;

(e) an annular running surface being secured to said locking ring and in mating running engagement with the annular frontal surface of said second constructional unit; and (f) a plurality of resilient attachment elements distributed about the circumference of said first constructional unit and applying an axial biasing force against said ring so as to cause said annular running surface to lie against the annular frontal surface of said second constructional unit.

2. The shaft coupling arrangement in accordance with claim 1 being characterized in that said axial locking ring is secured to said first constructional unit with a plurality of axis-parallel screw bolts about the circumference thereof, and wherein resilient spring means are disposed along said bolts to apply a force biasing said locking ring against the annular frontal surface of said second constructional unit.

* * * * *